United States Patent [19]
Niiho et al.

[11] Patent Number: 4,633,419
[45] Date of Patent: Dec. 30, 1986

[54] ANGLE MEASURING DEVICE

[75] Inventors: Masaaki Niiho; Masato Hara; Eiji Takasugi, all of Tokyo, Japan

[73] Assignee: Asahi Kogaku Kogyo K.K., Tokyo, Japan

[21] Appl. No.: 586,923

[22] Filed: Mar. 7, 1984

[30] Foreign Application Priority Data

| Mar. 7, 1983 | [JP] | Japan | 58-32436[U] |
| Mar. 7, 1983 | [JP] | Japan | 58-32437[U] |
| Mar. 22, 1983 | [JP] | Japan | 58-41019[U] |

[51] Int. Cl.$^4$ .................. G06F 15/20; G01B 7/30
[52] U.S. Cl. .................. 364/559; 364/565; 33/1 PT
[58] Field of Search .......... 364/559, 565, 556, 560; 33/1 PT, 1 N

[56] References Cited

U.S. PATENT DOCUMENTS

| 3,634,946 | 1/1972 | Star | 33/1 PT X |
| 4,136,558 | 1/1979 | Lukes et al. | 364/559 X |
| 4,181,962 | 1/1980 | West, Jr. et al. | 364/565 |
| 4,318,225 | 3/1982 | Jenkinson | 33/1 PT |
| 4,449,191 | 5/1984 | Mehnert | 364/559 |
| 4,492,031 | 1/1985 | Koenuma | 33/1 PT |

Primary Examiner—Edward J. Wise
Attorney, Agent, or Firm—Sughrue, Mion, Zinn, Macpeak & Seas

[57] ABSTRACT

An angle measuring device operating without a graduated board and of a type including a disc rotating a constant speed having a reference point fixed on the housing of a disc, an angle measuring arm concentric with the disc and rotatable, and a measuring point provided on the arm. In accordance with the invention, the ratio of an angle measuring time required for the disc to turn from the reference point to the measuring point to a one-revolution time of the disc is multiplied by 360° to obtain an angle which is determined by the reference point, the center of the disc and the measuring point. This is effected with an angle measuring time integrating device for integrating data points corresponding to one-revolution time for each revolution of the disc, and an arithmetic unit for calculating a measured angle according to the ratio of the integrated value of the angle measuring times to the integrated value of the one-revolution times after the disc has made a predetermined number of revolutions.

5 Claims, 15 Drawing Figures

ANGLE MEASURING DEVICE

BACKGROUND OF THE INVENTION

This present invention relates to an angle measuring device operating without a graduated board.

Figure 1:
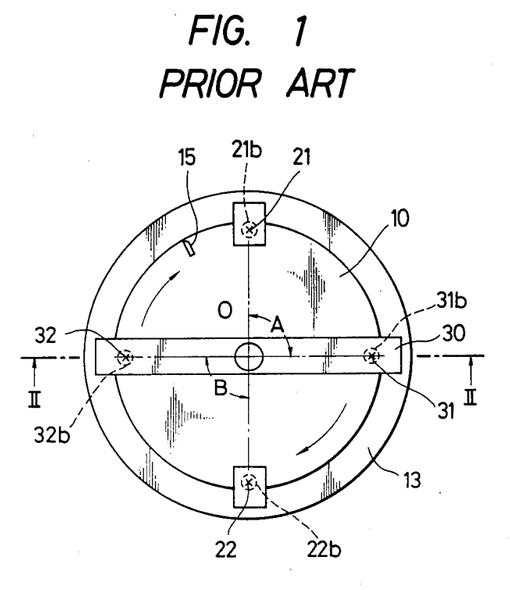
FIG. 1 is a plan view showing a conventional angle measuring device.
Figure 2:
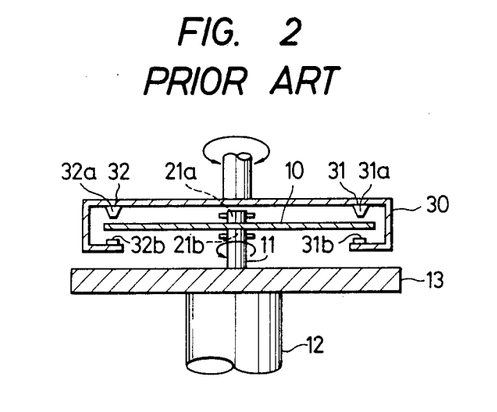
FIG. 2 is a sectional view taking along a line II—II in FIG. 1.

An example of an angle measuring device operating without a graduated board is disclosed in Report ETL-TR-1 (1972.1) of the U.S. Army Engineer Topographic Laboratories and is well known in the art. FIG. 1 is a plan view of the device, and FIG. 2 is a sectional view taken along a line II—II in FIG. 1. In this device, a rotary disc 10 together with shafts 11 and 12 and a base 13 is rotated by a motor (not shown). The rotary disc 10 has a slit 15. In FIG. 1, reference character O designates the center of rotation of the disc.

A first reference point 21 is fixedly provided on a housing (not shown). A light-emitting element 21a and a light-sensing element 21b are fixedly provided at the position of the first reference point on the housing on both sides of the disc 10. The slit 15 passes between the elements 21a and 21b while the disc is rotating. A second reference point 22 is provided on the housing with the points 21 and 22 being positioned symmetrically with respect to the center of rotation O. A light-emitting element 22a and a light-sensing element 22b are disposed at the position of the second reference point 22 on the housing with the elements 22a and 22b being on both sides of the disc 10 and with the slit 15 passing between the elements 22a and 22b while the disc is rotating.

An angle measuring arm 30, rotable around the point O, has a first measuring point 31 at one end. A light-emitting element 31a and a light-sensing element 31b are fixedly provided at the position of the first measuring point 31 on the arm 30 on both sides of the disc 10. The slit 15 passes between the elements 31a and 31b while the disc is rotating. A second measuring point 32 is provided on the arm 30 is such a manner that the first and second measuring points 31 and 32 are positioned symmetrically with respect to the center of rotation O. A light-emitting element 32a and a light-sensing element 32b are fixedly provided at the position of the second measuring point on the arm 30. The slit 15 passes between the elements 32a and 32b while the disc 10 is rotating.

In FIG. 1, an angle A is formed by a straight line passing through the first reference point 21 and the center of rotation O and a straight line passing through the first measuring point 31 and the center of rotation O, and an angle B is formed by a straight line passing through the second reference point 22 and the center of rotation O and a straight line passing through the second measuring point 32 and the center of rotation O.

An angle between two objects can be measured with the above-described device as follows: First, the center O is made to coincide with the position where the angle is to be measured. Then, the first reference point 21 is so set that the first object is on an extension of line passing through the point O and the first reference point 21. Thereafter, the first measuring point 31 is so set that the second object is on an extension of a line passing through the point O and the first measuring point 31. In other words, the arm 30 is turned so that the second object is on the extension of the line passing through the point O and the point 31.

Figure 3:
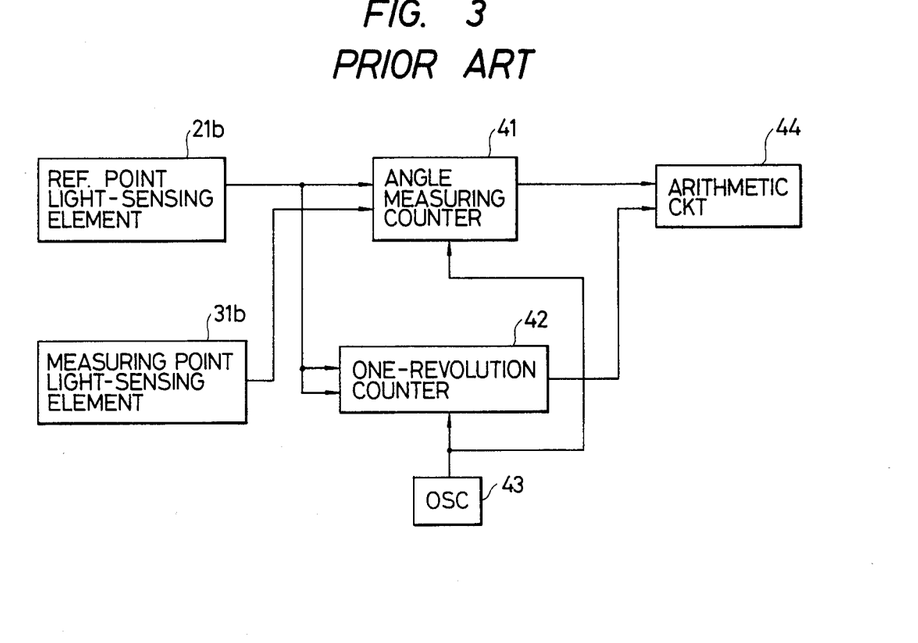
FIG. 3 is a diagram showing the arrangement of a conventional angle measuring device of FIGS. 1 and 2.

FIG. 3 is a block diagram showing a signal processing circuit used in the above-described angle measuring device. An angle measuring counter 41 counts the output pulses from an oscillator circuit 43 for a period of time which elapses from the time instant that it receives the output signal of the first reference point light-sensing element 21b until it receives the output signal of the first measuring point light-sensing element 31b. A one-revoution counter 42 counts the output pulses of the oscillator circuit 43 for a period of time which elapses from the time instant that it receives one output signal of the first reference point light-sensing element 21b until it receives the next output signal of the same element 21b. In an arithmetic circuit 44, the ratio of the number of pulses counted by the counter 41 to the number of pulses counted by the counter 42 is multiplied by 360° to calculate the angle A. While the disc 10 makes a first revolution, the counters 41 and 42 operate as described above, and while the disc 10 makes the next revolution, the arithmetic circuit 44 performs the above-described calculations. This operation is repeatedly carried out. In other words, the counting operations are carried out for odd-numbered revolutions of the disc 10, and the calculations are carried out for even-numbered revolutions of the disc 10. When the last counting operation and the last calculation have been achieved, the resultant data points B are averaged.

However, sometimes the center of rotation of the disc 10 may not coincide with the center of rotation of the arm 30. In this case, a measuring angle error (eccentric error) arises. In order to correct such eccentric error, a so-called "180° opposed reading method" is employed. In accordance with that method, the angle A is measured by using the first reference point 21 and the first measuring point 31 as described above, similarly the angle B is measured by using the second reference point 22 and the second measuring point 32 which are respectively opposed to the first reference point 21 and the first measuring point 31, and the average value of the angles A and B is obtained to correct the eccentric error.

The above-described method suffers from a drawback that a relatively long time is required for the measurment. During one revolution of the disc 10 the angle measuring counter 41 and the one-revolution counter 42 count the numbers of pulses corresponding to given angles, and during the next revolution of the disc 10 the arithmetic circuit 44, receiving the outputs of these counters, performs the above-described calculations. That is, in order to measure the angle A once, it is necessary to cause the disc 10 to make two revolutions. If the above-described cycle is repeated ten times with the stability of the motor used to rotate the disc 10 taken into account, then 20 revolutions of the disc 10 are required. If the above-described operation is performed for the angle B also to correct for the eccentric error, it is required to cause the disc 10 to make 40 revolutions. Thus, in the conventional method, the time required for angle measurement is relatively long.

In view of the above-described difficulties accompanying a conventional angle measuring device, an object of the invention is to provide an angle measuring device operating without a graduated board in which the time required for angle measurement is relatively short.

Further, the above-described conventional device suffers from a problem that sometimes the measured angle is incorrect. This will be described in more detail. In order to measure the angle A, the disc 10 is rotated. More specifically, the angle is calculated from a time required for the slit 15 to reach the light-sensing element 31b from the light-sensing element 21b during the rotation of the disc 10. Accordingly, in the case where the angle A is near 0°, the slit 15 passes the light-sensing element 31b immediately after it has passed the light-sensing element 21b, and therefore the output pulse of the light-sensing element 31b should rise immediately after the output pulse of the light-sensing element 21 has risen. However, in practice, sometimes the order of rising of the two signals is reversed because of small variation of the two pulses. In such a case, the angle A is determined to be about 360° upon processing the signals. On the other hand, although an angle may be near 360°, it may be determined to be about 0°. Thus, not only when an angle of about 0° is measured will the measured value be incorrect as described above, but also when an angle is repeatedly measured to obtain the average value, the result may be incorrect.

In view of the foregoing, another object of the invention is to provide an angle measuring device operating without a graduated board, in which, when an angle of about 0° is measured, the results of the measurement is correct.

Further, in the above-described conventional device, an angle $\theta$ is formed between a straight line passing through the reference point 21 and the central point O and a straight line passing through the measuring point 31 and the central point O.

The above-mentioned Report discloses the study of an eccentric error (which is an angle measurement error due to the fact that the center of rotation of the disc 10 deviates from the center of rotation of the angle measuring arm 30) and described a so-called "180° opposed reading method" used to correct the eccentric error. However, even if such a method is employed, the eccentric error may still not be sufficiently corrected.

Figure 4:
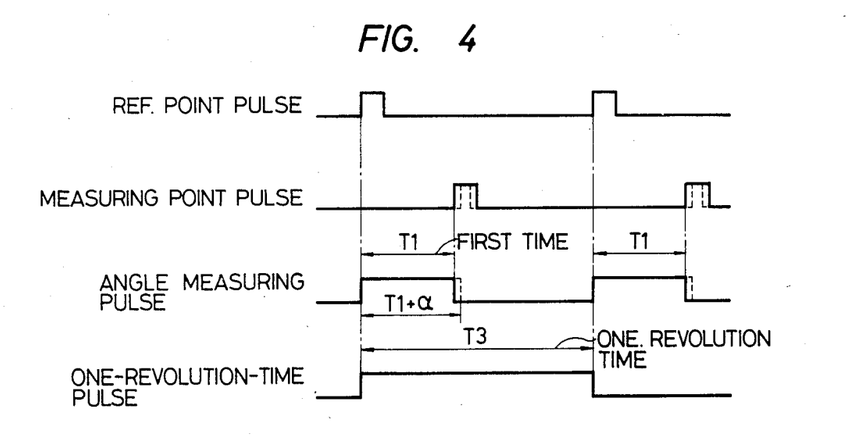
FIG. 4 is a timing diagram relating to the device of FIGS. 1 and 2.

FIG. 4 is a timing chart for the above-described conventional angle measuring device. When the slit 15 of the disc 10 passes through the reference point 21, a reference point pulse is produced by the light-sensing element 21b, and when the slit 15 passes through the measuring point 31, a measuring point pulse is generated by the light-sensing element 31b. A period of time between the rise of the reference point pulse and the rise of the measuring point pulse is referred to as a first time $T_1$, and a period of time between the rise of a reference point pulse and the rise of the next reference point pulse, i.e., a period of time for the disc 10 to make one complete revolution, is referred to as a one-revolution time $T_3$.

In the above-described conventional device, the angle $\theta$ can be obtained from the following expression:

$$\theta \text{ (degree)} = (T_1/T_3) \times 360°.$$

Figure 5A:
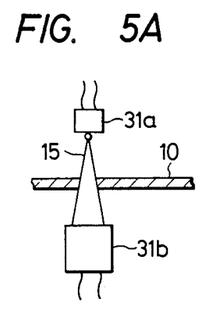
FIG. 5A and 5B show the structure of light-emitting and light-sensing elements in the device of FIGS. 1 and 2.
Figure 5B:
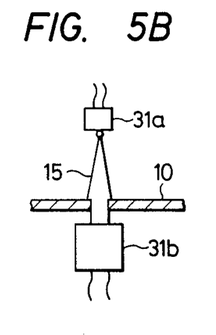

However, the conventional device suffers from a drawback in that when the center of the disc 10 is shifted from the center of rotation of the angle measuring arm 30, the measured angle value includes an eccentric error. In case where the center of the disc 10 is shifted from the center of rotation of the arm 30, the large area of the light-sensing element 31b receives the light beam from the light-sensing element 31a when the slit 15 comes closest to the light-sensing element 31a as shown in FIG. 5A, and the small area of the light-sensing element 31b receives the light beam when the slit 15 comes closest to the light-sensing element 31b as shown in FIG. 5B. Accordingly, when the center of the disc 10 is not shifted from the center of rotation of the arm 30, the waveforms of the pulses are as indicated by the solid lines in FIG. 4. However, when the center of the disc 10 is shifted from the center of rotation of the arm 30, the waveforms of the pulses are as indicated by the broken lines in FIG. 4.

As is apparent from FIG. 4, the first time $T_1$ in the case where the center of the disc 10 is not shifted from the center of rotation of the arm 30 is different from the first time $T_1 + \alpha$ in the case where the center of the disc 10 is shifted from the center of rotation of the arm. Thus, in the latter case, the measured angle value includes an eccentric error.

In other words, in the case where the center of the disc 10 does not coincide with the center of rotation of the angle measuring arm, depending on the position of the arm on the circumference, the position of passage of the slit 15 is changed in the optical path from the light-sensing element 31a to the light-sensing element 31b (the position of the slit 15 in FIG. 5A being different from that of the slit 15 in FIG. 5B), and therefore the output of the light-sensing element 31 is changed. Because of this phenomenon, in the conventional device, eccentric error is not sufficiently corrected.

In view of the foregoing, another object of the invention is the provision of an angle measuring device operating without a graduated board in which, even when the center of the rotary disc is shifted from the center of rotation of the angle measuring arm, the measured angle includes no eccentric error.

SUMMARY OF THE INVENTION

The foregoing and other objects of the invention have been achieved by the provision of an angle measuring device which includes a disc rotating at a constant speed, a reference point fixedly provided on the housing of the disc, and an angle measuring arm concentric with the disc and rotatable, and a measuring point provided on the arm, wherein the ratio of an angle measuring time required for the disc to turn from the reference point to the measuring point to one-revolution time required for the disc to make one revolution is multiplied by 360° to obtain an angle which is determined by the reference point, the center of the disc and the measuring point. According to the invention, this technique is implemented with an angle measuring device including angle measuring time integrating means for integrating data corresponding to the angle measuring time every revolution of the disc, one-revolution-time integrating means for integrating data points corresponding to the one-revolution time every revolution of the disc, and arithmetic means for calculating a measured angle according to the ratio of the integrated value of the angle measuring times to the integrated value of the one-revolution times after the disc has made a predetermined number of revolutions.

Also, objects of the invention have been achieved by the provision of an angle measuring device which includes a disc rotating at a constant speed, a reference point for the disc fixedly secured to the housing, a reference region including the reference point, an angle measuring arm concentric with the disc and rotatable, first and second measuring points provided on the arm positioned symmetrically with respect to the center of rotating of the arm, arithmetic means for multiplying the ratio of an angle measuring time required for the disc to turn from the reference point to the first or second measuring point to one-revolution time required for the disc to make one complete 360° revolution, determining means for determining whether or not the first measuring point is in the reference region, changeover means for switching between measuring operations in such a manner that when the first measuring point is in the reference region a period of time required for the disc to turn from the reference point to the second measuring point is measured and when the first measuring point is out of the reference region a period of time required for the disc to turn from the reference point to the first measuring point is measured, and measured angle correcting means for subtracting 180° from a measured angle when the first measuring point is in the reference region.

DESCRIPTION OF THE PREFERRED EMBODIMENTS

The invention will be described with reference to preferred embodiments shown in the accompanying drawings, in which like parts are designated by like reference numerals or characters.

Figure 6:
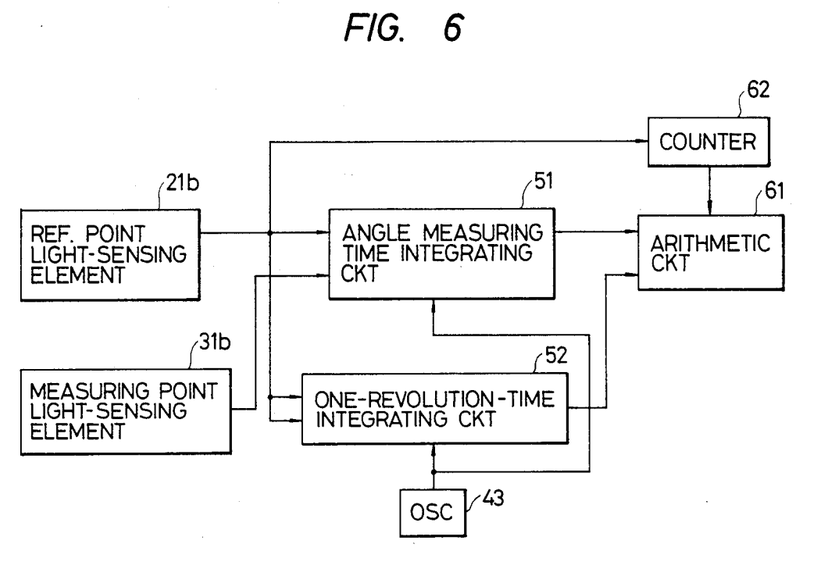
FIG. 6 is a diagram of a first embodiment of an angle measuring device constructed in accordance with the invention.

FIG. 6 is a block diagram showing a first embodiment of an angle measuring device according to the invention. In FIG. 6, an angle measuring time integrating circuit 51 integrates data corresponding to an angle measuring time every revolution of the disc 10. While the disc 10 is making one revolution, the slit 15 of the disc 10 passes through the first reference point light-sensing element 21b and the latter provides an output. For a period of time which elapses from the time instant that the light-sensing element 21b provides the output as described above until the slit 15 passes through the first measuring point light-sensing element 31b, the integrating circuit 51 counts the output pulses of an oscillator circuit 43. While the disc 10 is making the next revolution in the integrating circuit the present count value is integrated with the preceding count value. This operation is repeatedly carried out.

A specific example of the integrating circuit 51 includes a flip-flop for providing an output during the period of time between the rise of the output pulse of the first reference point light-sensing element 21b and the rise of the output pulse of the first measuring point light-sensing element 31b, an AND gate receiving the output of the flip-flop and the output of the oscillator circuit 43, and a counter for counting the output pulses of the AND gate.

Further in FIG. 6, a one-revolution-time integrating circuit 52 operates to integrate data corresponding to the one revolution time of the disc; that is, it operates to integrate the output pulses of the oscillator circuit every revolution of the disc 10.

A specific example of the integrating circuit 52 includes a flip-flop for providing an output during the period of time between the rise of an output pulse of the light-sensing element 21b and the rise of the next output pulse of the same element 22b, an AND gate receiving the output of the flip-flop and the output of the oscillator circuit 43, and a counter for counting the output pulses of the AND gate.

An arithmetic circuit 61 in FIG. 6, which operates to calculate a measured angle according to the ratio of the integration value of angle measuring times provided by the measuring angle time integrating circuit 51 to the integration value of one-revolution-times provided by the one-revolution-time integrating circuit 52, operates after the disc 10 has made a predetermined number of revolutions.

Further in FIG. 6, a counter 62 counts the output pulses of the first reference point light-sensing element 21b to detect the number of revolutions of the disc 10. The counter 62 outputs a signal to start the arithmetic circuit 61 when the number of revolutions thus detected reaches a predetermined value.

Figure 7:
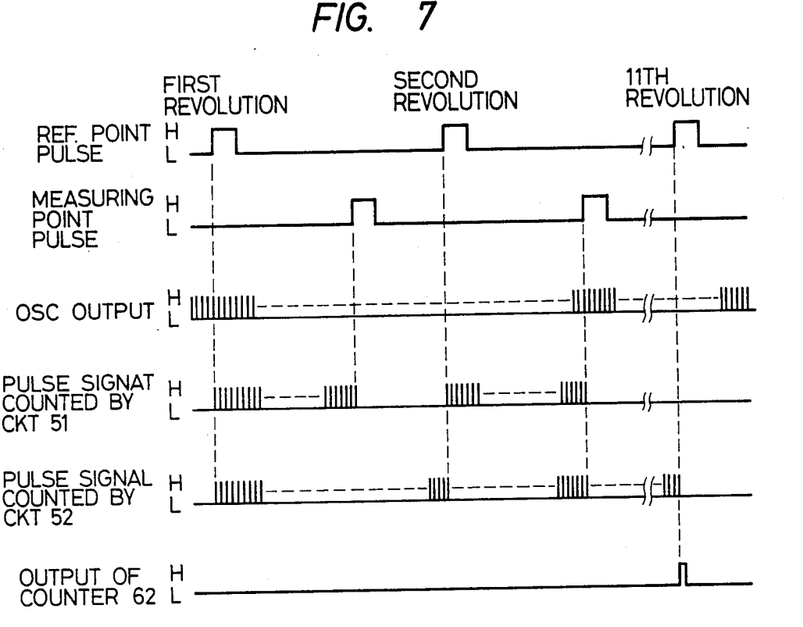
FIG. 7 is a timing diagram relating to the embodiment of FIG. 6.

The operation of the angle measuring device according to the invention will be described with reference to a timing chart of FIG. 7.

The motor is started by turning on the power switch. When the speed of the motor has been stabilized, a measuring button (not shown) is depressed. The number of revolutions which have been made by the disc 10 after the depression of the measuring button are indicated in the uppermost part of FIG. 7. The oscillator circuit 43 outputs pulses at all times. During the first revolution of the disc 10, the measuring angle time integrating circuit 51 counts the output pulses of the oscillator circuit 43 for the period of time between the rise of the output pulse of the first reference point light-sensing element 21b and the rise of the output pulse of the first measuring point light-sensing element 31b. During the same revolution, the one-revolution-time integrating circuit 52 also counts the output pulses of the oscillator circuit 52.

During the second revolution, the integrating circuit 51 counts the output pulses of the oscillator circuit 43 for the period of time between the rise of the output pulse of the light-sensing element 21b and the rise of the output pulse of the light-sensing element 31b while adding to the count the preceding count value. On the other hand, during the same revolution, the integrating circuit 52 counts the output pulses of the oscillator circuit 43 while adding to the count the preceding count value.

When the disc 10 has made a predetermined number of revolutions while the above-described adding and counting operations are carried out, the adding and counting operations are ended. At that time, the counter 62 applies a trigger signal to the arithmetic circuit 61 to cause the latter to carry out a calculation for obtaining a measured angle according to the ratio of the integration value of the angle measuring times to the integration value of the one-revolution-times. In other words, in the arithmetic circuit 61, the count value of the integrating circuit 51 is divided by the count value of the integrating circuit 52 and multiplied by 360°.

Accordingly, in the case, for instance, where the angle A is measured ten times and the average value of the measured angle values is obtained, the measurement can be accomplished merely by ten revolutions of the disc 10. Thus, the measurement time is short as a whole. On the other hand, in the conventional device, when the angle A is measured ten times, it is necessary to cause the disc 10 to make twenty revolutions. It can be understood from this fact that, in the device of the invention, the measurement can be achieved in a short time.

In order to practice the 180° opposed reading method, the angle B is also measured similarly to the case of the angle A. It is apparent that in this case the measurement can be achieved in a short time. The angle measuring time integrating circuit 51 and the one-revolution-time integrating circuit 52 may be modified if the same effects can be obtained. The number of revolutions of the disc 10 may be selected as desired. The counter 62 and the arithmetic circuit 61 may be implemented with devices such as microcomputers. That is, instead of the counter 62 and the arithmetic circuit 61, microcomputers having the same functions may be used.

As is apparent from the above description, the angle measuring device operating without a graduated board according to the invention has an effect that the measurement time is reduced.

Figure 8:
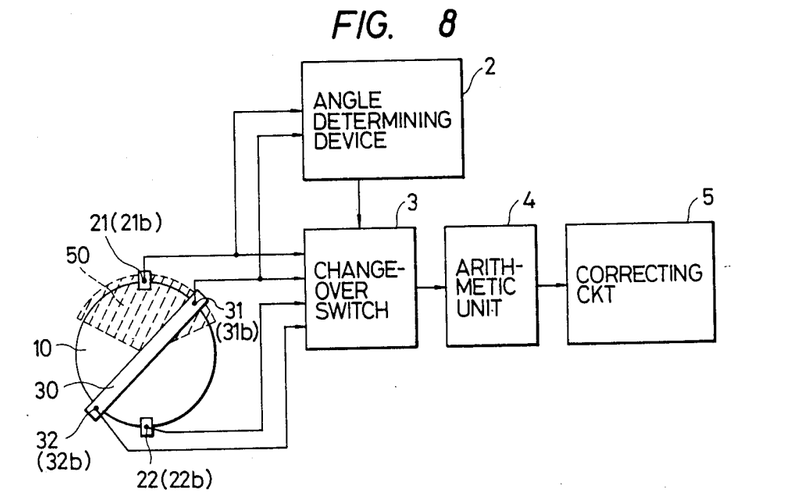
FIG. 8 is a diagram showing the arrangement of another embodiment of angle measuring device of the invention.

FIG. 8 is an explanatory diagram showing the arrangement of another embodiment of an angle measuring device according to the invention. In FIG. 8, a disc 10 rotating at a constant speed, reference points 21 and 22, and angle measuring arm 30 and measuring points 31 and 32 are the same as those in FIG. 1. A reference region 50 may include the reference points 21 and 22; however, in this embodiment, it includes the first reference point 21. An angle determining device 2 operates to determine whether or not the first measuring point 31 is in the reference region 50. An arithmetic unit 4 operates to multiply the ratio of an angle measuring time required for the disc 10 to turn from the reference point 21 or 22 to the measuring point 31 or 32 to a one-revolution time required for the disc 10 to make one complete 360° revolution. A change-over switch 3 operates to change measuring operations in such a manner that when the first measuring point 31 is in the reference region 50, a time required for the disc 10 to turn from the reference point 21 to the second measuring point 31 is measured and when the first measuring point 31 is out of the reference region 50, a time required for the disc 10 to turn from the reference point 21 to the first measuring point 31 is measured. A correcting circuit 5 operates to subtract 180° from a measured angle when the first measuring point 31 is in the reference region 50.

Figure 9:
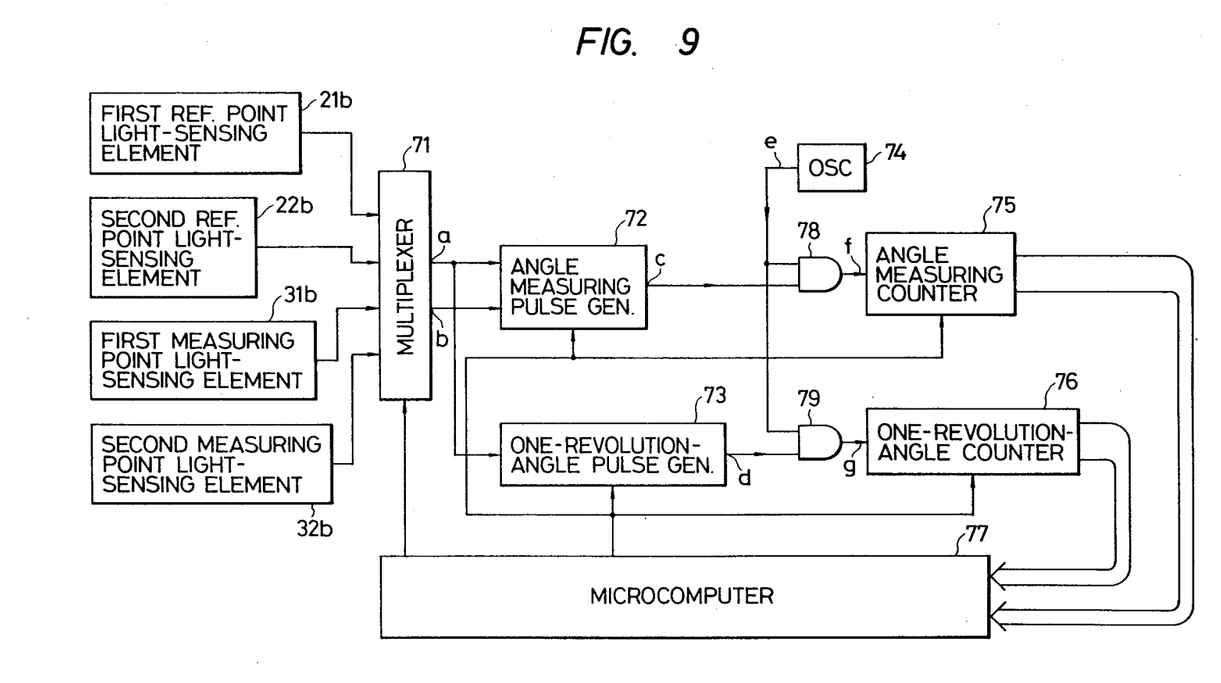
FIG. 9 is a detailed diagram of the device of FIG. 8.

FIG. 9 is a block diagram showing a specific example of the angle measuring device according to the invention. First, the measurement of the angle A in FIG. 1 will be described. In FIG. 9, a multiplexer 71 operates to multiplex one of the output signals of the light-sensing elements 21b and one of the output signals of the light-sensing elements 31b, thus combining two lines into one line. The multiplexer 71 has a terminal a for providing the output pulse of the reference point light-sensing element 21b or 22b, and a terminal b for providing the output pulse of the measuring point light-sensing element 31b or 32b.

An angle measuring pulse generating circuit 72 includes a flip-flop used to generate a pulse the duration of which is equal to the period of time between the rise of the output pulse of the first reference point light-sensing element 21b and the rise of the first measuring point light-sensing element 31b. A one-revolution-angle pulse generating circuit 73 includes a flip-flop used to produce a pulse the duration of which is equal to the period of time between the rise of an output pulse of the first reference point light-sensing element 21b and the rise of the next output pulse of the same element 21b. The circuits 72 and 73 have the output terminals c and d, respectively.

An angle measuring counter 75 operates to count the output pulses of an oscillator circuit 74 while the pulse generating circuit 72 is providing its output. The counter 75 integrates not only pulses during one revolution of the disc 10 but also the pulses during several revolutions of the disc 10. A one-revolution-angle counter 76 operates to count the output pulses of the oscillator circuti 74 while the one-revolution-angle pulse generator circuit 73 is providing its output. The counter 76 integrates the pulses during several revolutions of the disc 10.

A microcomputer 77 determines whether or not the first measuring point 31 is in the reference region 50 and multiplies the ratio of an angle measuring time required for the disc 10 to turn from the first reference point 21 to measuring point 31 or 32 to the one revolution time required for the disc 10 to make one complete revolution. The microcomputer 77 further functions to drive the multiplexer 71 in such a manner that, when the first measuring point 31 is in the reference region 50, a time required for the disc 10 to turn from the reference point to the second measuring point 32 is measured, and when the first measuring point 31 is out of the reference region 50, a time required for the disc 10 to turn from the reference point to the first measuring point 31 is measured. The microcomputer 77 performs a measured angle correcting function by subtracting 180° from a measured value when the first measuring point 31 is in the reference region 50.

Figure 10:
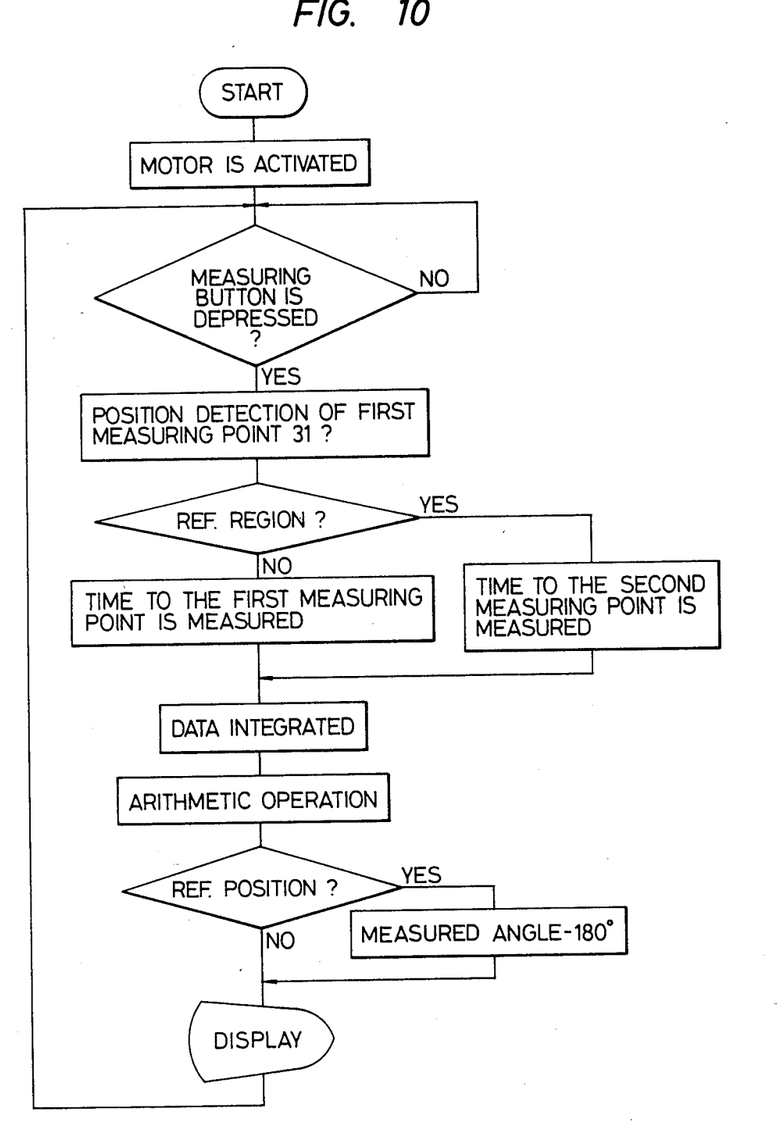
FIG. 10 is a flow chart relating to the device of FIGS. 8 and 9.

FIG. 10 is a flow chart for a description of the operation of the device shown in FIG. 9.

When the power switch is turned on, the motor is activated to rotate the disc 10. Under this condition, a measuring button is depressed to detect the position of the first measuring point 31. That is, the angle A is roughly measured for a period of time required for the slit 15 to move from the first reference point 21 to the first measuring point 31. Next, it is determined according to the angle A thus measured whether or not the first measuring point 31 is in the reference region 50. When the first measuring point 31 is in the reference region 50, a period of time for the disc to turn from the first reference point to the second measuring point 32 is measured. That is, under an instruction from the microcomputer 77, the multiplexer 71 operates to provide the output pulse of the first reference point light-sensing element 21b at the terminal a and to provide the output pulse of the second measuring point light-sensing element 32b at the terminal b. When the first measuring point 31 is out of the reference region 50, the multiplexer 71 operates to provide the output pulse of the first reference point light-sensing element 21b at the terminal a and to provide the output pulse of the first measuring point light-sensing element 31b at the terminal b.

When the operation described above has been carried out, the pulse generating circuits 72 and 73 output pulse (at the circuit points c and d) having durations as shown in FIG. 6, respectively. For instance, when the measurement is repeated ten times, ten data points are integrated. The number of pulses integrated by the angle measuring counter 35 is divided by the number of pulses integrated by the one-revolution-angle counter 76, and the result of division is multiplied by 360°.

Thereafter, only when the first measuring point is in the reference region 50 is the measured value corrected by subtracting 180° from it. The measured angle thus obtained is displayed on the display unit.

Accordingly, in the case where the angle A is about 0°, the number of pulses counted by the angle measuring counter 75 is that corresponding to about 180° at all times, and it will never be a number of pulses corresponding to about 0° or about 360°. Therefore, the measured angle is accurate, and the angle measuring device of the invention, unlike the conventional angle measuring device, is free from the problem that the measured angle is not accurate.

In the angle measuring device in FIGS. 9 and 10, the angle A is measured a plurality of times. However, the technical concept of the invention can be applied to the case where the angle A is measured only once. In that case, the angle measuring counter 75 and the one-revolution-angle counter 76 may be devices which do not perform integration. Accordingly, in this case, the step of data integration can be omitted from the flow chart of the FIG. 10. In addition, the width of the reference region 50 can be set as desired.

Figure 11:
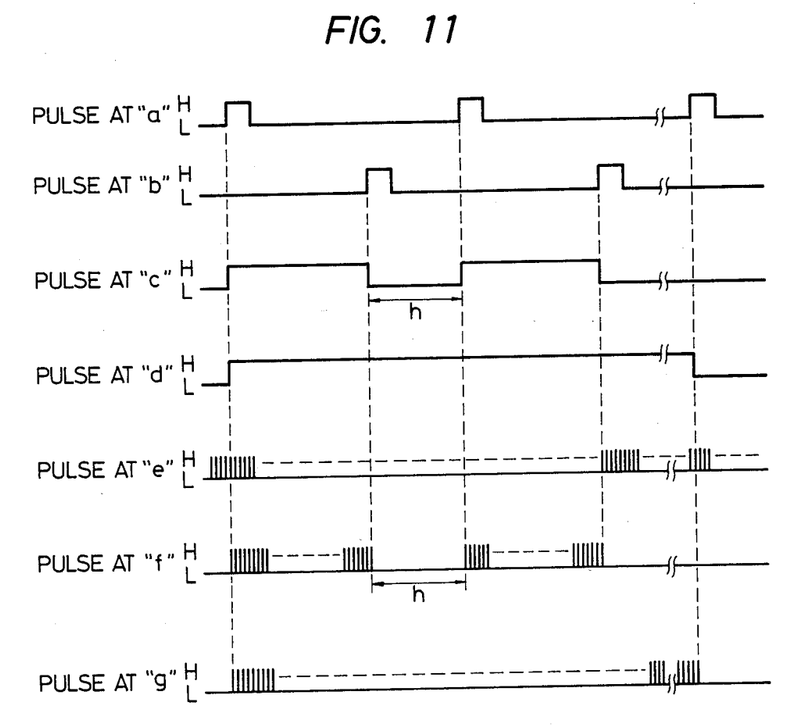
FIG. 11 is a waveform diagram relating to the FIGS. 8 and 9.

The period of time of a part h of the waveform of the pulse at the circuit point c in FIG. 11 which is at the low level may be utilized to perform the following operation: During that period of time, data corresponding the angle between the reference point and the measuring point can be written in the microcomputer. The data can be written in the microcomputer whenever the disc 10 makes one complete revolution. Accordingly, the microcomputer can compute the amount of deviation of each data point. The device may be so designed that, if the amount of deviation is over a predetermined value, the display of the measured value is stopped. That is, if the arm 30 setting is unstable, then the amount of deviation of the data is large. In this case, the measured value is low in reliability, and accordingly it is undesirable to display the measured value. Thus, the device may be so designed that, when the amount of deviation of the data which is provided every revolution of the disc 10 is more than the predetermined value, the measured value is not displayed.

The invention has been described with reference to the case where the angle A is measured. However, as in the case of the angle A, the angle B may be measured, and the average angle of the angles A and B obtained to eliminate the eccentric error.

As is apparent from the above description, the angle measuring device operating without the graduated board according to the invention has a merit that when an angle to be measured is about 0°, the measured value is accurate.

Figure 12:
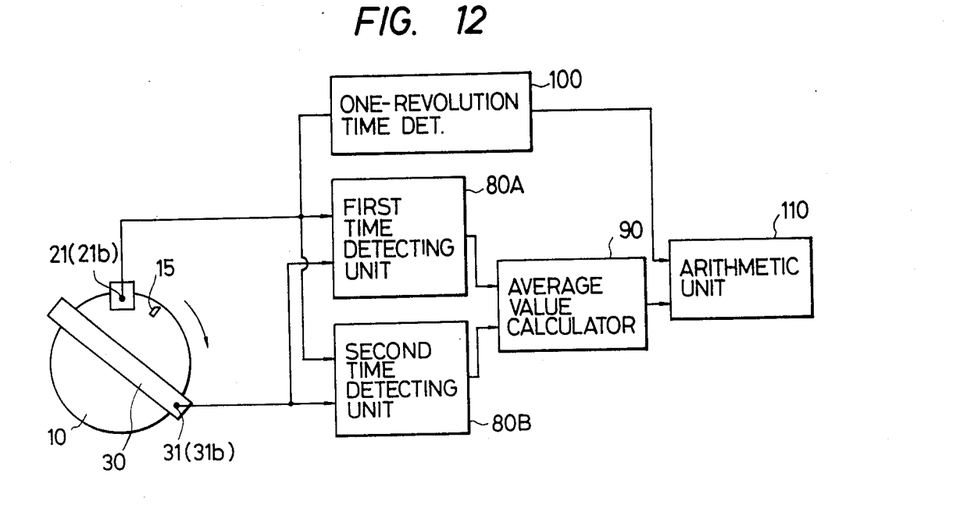
FIG. 12 is an explanatory diagram showing the arrangment of a further embodiment of an angle measuring device of the invention.

FIG. 12 is an explanatory diagram showing the arrangement of yet another embodiment of an angle measuring device according to the invention. The device has a rotary disc 10, a reference point 21, and an angle measuring arm 30 which are the same as those in the conventional device shown in FIGS. 1 and 2. In addition, the definitions of the reference point pulse and the measuring point pulse are the same as those used in the description of the conventional device.

The device of this embodiment of the invention has a first time detecting unit 80A for detecting a first time between the rise of the reference point pulse and the rise of the measuring point pulse, and a second time detecting unit 80B for detecting a second time between the fall of the reference point pulse and the fall of the measuring point pulse.

The device further includes an average value calculator 90 for calculating the average time of the first and second times, a one-revolution-time detector 60 for detecting a time required for the disc 10 to make one revolution, and an arithmetic unit for multiplying the ratio of the average time to a one-revolution time of the disc 10 by 360°.

Figure 13:
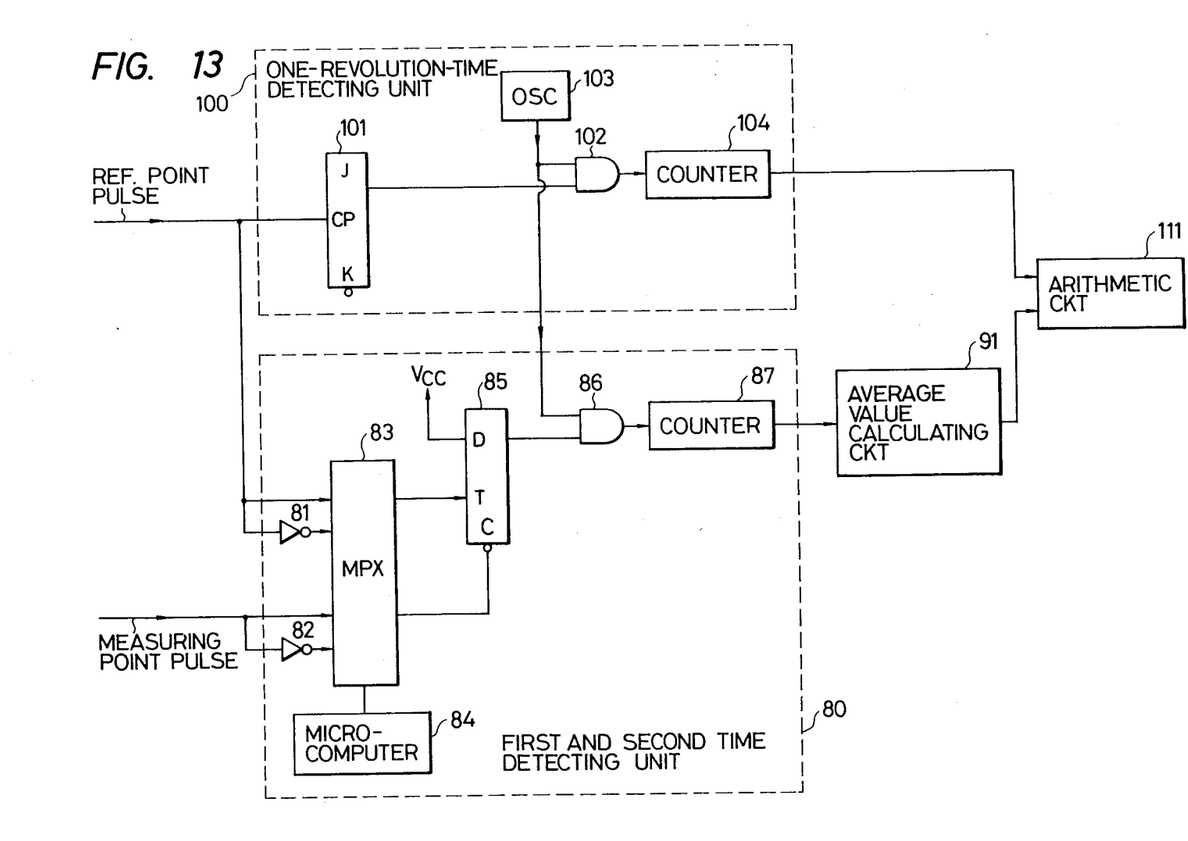
FIG. 13 is a detailed diagram of the device of FIG. 12.

FIG. 13 is a circuit diagram showing a specific example of the embodiment shown in the FIG. 12. A first and second time detecting unit 80 performs the function of the first time detecting unit 80A and the function of the second time detecting unit 80B. A multiplexer is switched to apply the reference point pulse and the measuring point pulse directly or to apply these pulses through respective inverters 81 and 82. The switching is suitably controlled by a microcomputer 84. The state of a D-type flip-flop 85 is changed by the rise of the pulse applied through the multiplexer 85. The output pulse of the flip-flop 85 is an angle measuring pulse. During the duration of the angle measuring pulse, a clock pulse from an oscillator circuit 103 is outputted through an AND gate 86. The output pulses are counted by a counter 87. An average value calculating circuit operates to calculate the average value of the first time $T_1$ and the second $T_2$ which are provided by the detecting unit 80.

A J-K flip-flop 101 changes state (i.e., to frequency divide the reference point pulse signal) whenever the reference point pulse is applied thereto. The J-K flip-flop 101 provides a one-revolution time pulse for the period of time between the rise of a reference point pulse and the rise of the following reference point pulse. An AND gate 102 operates to pass the clock pulse signal outputted by the oscillator circuit 103 during the duration of the one-revolution time pulse. The clock pulse thus passed is counted by a counter 014.

An arithmetic circuit 111 operates to multiply the ratio of an average time provided by the average value calculating circuit 91 to the one-revolution time by 360°.

The operation of the device thus constructed will be described. It is assumed that the reference point pulse and the measuring point pulse are generated with a timing as shown in FIG. 14.

When, after the first reference point pulse has been produced, the measuring point pulse is provided subsequent to the first reference pulse, and the multiplexer delivers these pulses directly (without inversion) under control of the microcomputer 84. As a result, the D-type flip-flop 85 generates a measuring angle pulse, the duration of which is the first time $T_1$. During the period of time for which the measuring angle pulse is available, the counter 87 counts the clock pulses.

When, after the second reference point pulse has been produced, the measuring point pulse is generated subsequent to the second reference point, the multiplexer 83 operates to deliver pulses the polarities of which have been inverted by the inverters 81 and 82. As these pulses are applied to the D-type flip-flop 85, the latter produces a measuring angle pulse the duration of which is the second time $T_2$. During the period of time for which the measuring angle pulse is available, the counter 87 counts the clock pulses. In the average value calculating circuit 91, the two count values are added to each other, and the result of addition is divided by two.

Figure 14:
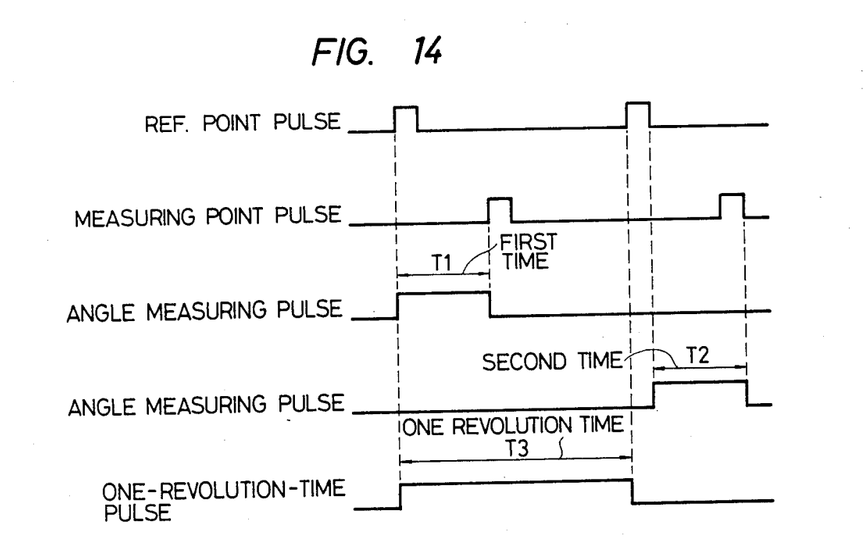
FIG. 14 is a timing diagram relating to the device of FIG. 12 and FIG. 10.

In FIG. 14, the angle measuring pulses are shown separately for convenience in description; however, it should be noted that in practice they should be on one and the same time axis.

The reference point pulse is subjected to one-half frequency division by the J-K flip-flop 101, thus becoming a one-revolution-time pulse, the duration of which is the one-revolution time $T_3$. During this one-revolution time, the counter 104 counts the clock pulses.

In the arithmetic circuit 111, the average time $((T_1+T_2)/2)$ outputted by the average value calculating circuit 51 is divided by the one-revolution time $T_3$ outputted by the counter 84, and the result of division is multiplied by 360° to obtain the angle $\theta$.

Since the average time of the first time $T_1$ and the second time $T_2$ is obtained as described above, even if the center of rotation of the disc 10 is shifted from the center of rotation of the angle measuring arm 30, no eccentric error is included in the measured angle.

In the example shown in FIG. 13, the first time detecting unit and the second time detecting unit are combined into one circuit. However, they may be provided separately. That is, two circuits each including a D-type flip-flop (85), AND gate (86) and counter (87) may be provided. In this case, one of the two circuits is used as the first time detecting circuit and the other as the second time detecting circuit.

In the above-described example, the one-revolution time $T_3$ is detected. However, in the case where the motor is very stable, the angle can be measured by a method in which only the first and second times $T_1$ and $T_2$ are measured and the results of measurements are entered into the above-described expression.

As is apparent from the above description, the angle measuring device according to this embodiment, which uses no graduated board, has an effect that, even if the center of rotation of the rotary disc does not coincide with the center of rotation of the angle measuring arm, the measured angle includes no eccentric error.

What is claimed is:

1. An angle measuring device comprising:
    a disc rotating at a constant speed;
    a reference point provided for said disc, said reference point being fixedly secured a housing;
    a reference region including said reference point;
    an angle measuring arm concentric with said disc and rotatable;
    first and second measuring points provided on said arm in such a manner that said first and second measuring points are positioed symmetrically with respect to the center of rotation of said arm;
    arithmetic means for multiplying a ratio of an angle measuring time required for said disc to turn from said reference point to said first or second measuring point to a one-revolution time required for said disc to make one complete rotation through 360°;
    determining means for determining whether or not said first measuring point is in said reference region;
    change-over means for switching measuring operations in such a manner that when said first measuring point is in said refernce region a period of time required for said disc to turn from said reference point to said second measuring point is measured and when said first measuring point is out of said reference region a period of time required for said disc to turn from said reference point to said first measuring point is measured; and
    measured angle correcting means for subtracting 180° from a measured angle when said first measuring point is in said reference region.

2. The angle measuring device as claim in claim 1, further comprising:
    angle measuring time integrating means of integrating data corresponding to said angle measuring time every revolution of said disc;
    one-revolution-time integrating means for integrating data corresponding to said one revolution time every revolution of said disc;
    arithmetic means for computing a measured angle according to a ratio of the integration value of said angle measuring time to the integration value of said one revolution time after said disc has made a predetermined number of revolutions.

3. The angle measuring device as claimed in claim 1, wherein said arithmetic means, said determining means, said change-over means and said measured angle correcting means operate when said disc has made one revolution.

4. In an angle measuring device which includes a disc having a slit and rotating at a constant speed, a reference point provided for said disc fixedly secured to a housing, an angle measuring arm substantially concentric with said disc and rotatable, and a measuring point on said angle measuring arm, and in which a reference point pulse is produced when said slit of said disc passes through said reference point and a measuring point pulse is generated when said slit of said disc passes through said measuring point, the improvement comprising:
    first time detecting means for detecting a first time which elapses from the rise of said reference point pulse until the rise of said measuring point pulse;
    second time detecting means for detecting a second time which elapses from the fall of said reference point pulse until the fall of said measuring point pulse;
    average value calculating means for calculating an average time of said first and second times;
    one-revolution-time detecting means for detecting a period of time required for said disc to make one revolution; and
    arithmetic means for multiplying a ratio of said average time to said period of time required for said disc to make one complete revolution through 360°.

5. The angle measuring device as claimed in claim 4, wherein said first and second time detecting means comprise:
- means for inverting polarities of said reference point pulse and said measuring point pulse;
- change-over means for selectively outputting said reference point pulse and said measuring point pulse directly or said referece point pulse and said measuring point pulse the polarities of which have been inverted; and
- a circuit for generating an angle measuring pulse corresponding to said first and second times according to output signals of said change-over means.

* * * * *